United States Patent [19]

Eaton et al.

[11] 3,873,000

[45] Mar. 25, 1975

[54] STICK DEPOSITOR WITH SURFACE ACTUATED ESCAPEMENT MECHANISM

[75] Inventors: George H. Eaton, West Vancouver; Roy A. McDonald, Richmond, British Columbia, both of Canada

[73] Assignee: Moore Dry Kiln Company of Canada Ltd., Richmond, British Columbia, Canada

[22] Filed: May 31, 1974

[21] Appl. No.: 475,096

[52] U.S. Cl. .............................. 221/298, 214/8.5 K
[51] Int. Cl. ............................................. B65g 59/06
[58] Field of Search ........... 221/194, 195, 210, 297, 221/298, 299; 214/6 A, 6 D, 8.5 C, 8.5 K; 133/5 A

[56] References Cited
UNITED STATES PATENTS

| | | | |
|---|---|---|---|
| 2,969,892 | 1/1961 | Sherman | 221/210 |
| 2,974,828 | 3/1961 | Matteson | 221/297 X |

FOREIGN PATENTS OR APPLICATIONS

| | | | |
|---|---|---|---|
| 760,081 | 6/1960 | France | 214/8.5 K |
| 347,472 | 8/1960 | Switzerland | 214/8.5 K |

*Primary Examiner*—Stanley H. Tollberg
*Assistant Examiner*—David A. Scherbel
*Attorney, Agent, or Firm*—Fetherstonhaugh & Co.

[57] ABSTRACT

Apparatus for placing sticks individually on to a surface, including a pair of opposed jaws swingably mounted on a container for a stack of sticks and positioned to support the lowermost stick at a discharge opening at the bottom of the container. Vertically movable supports are connected to the jaws so that the weight of the container and any sticks therein tends to move the jaws towards each other. A stop at the bottom of the container and below the jaws engages the surface during downward movement of the container to stop this movement and thereby cause the jaws to move away from each other to permit the lowermost stick to drop through the opening on to said surface, upward movement of the apparatus causing the jaws to move towards each other to support the next stick in the stack.

16 Claims, 8 Drawing Figures

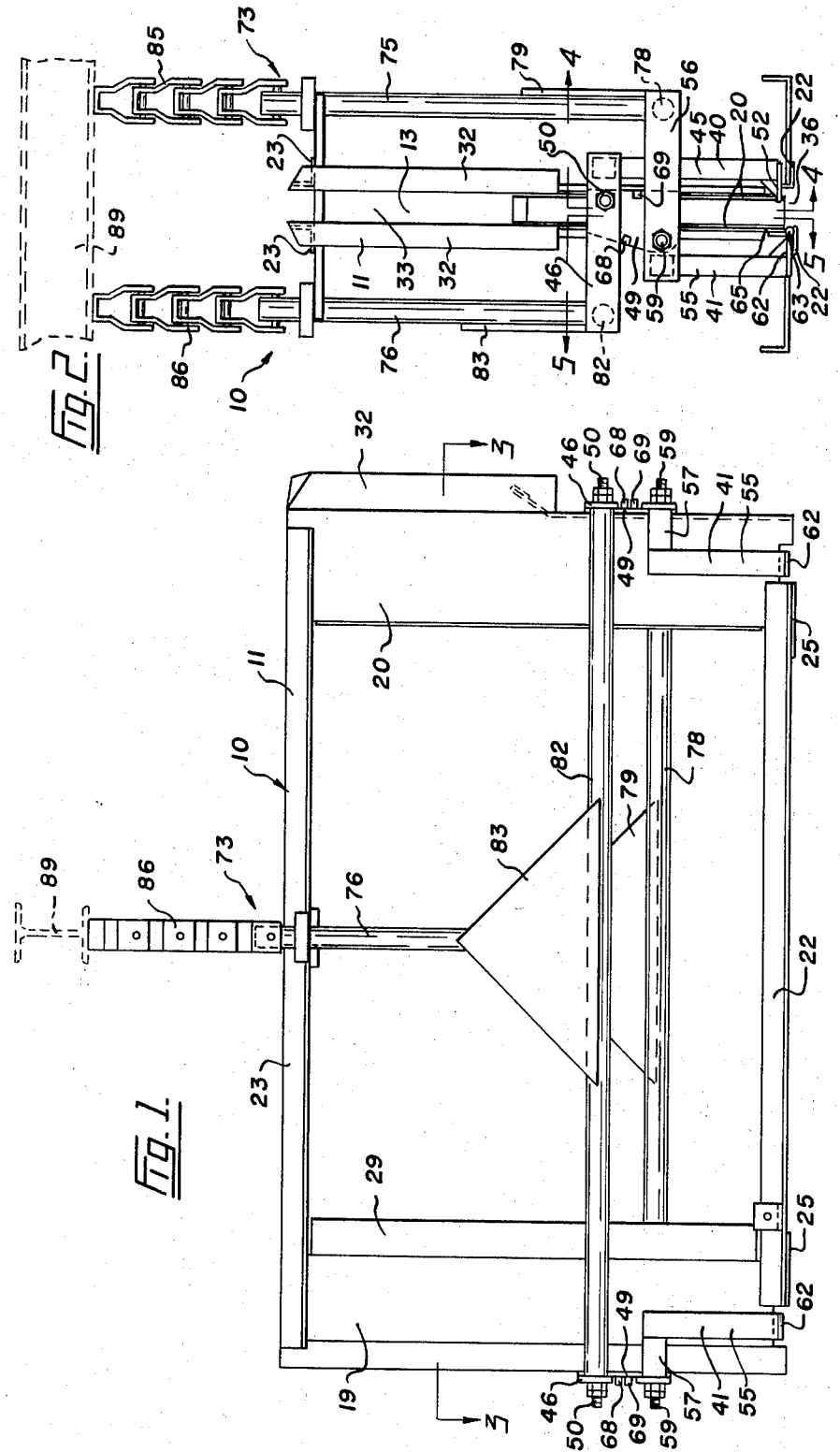

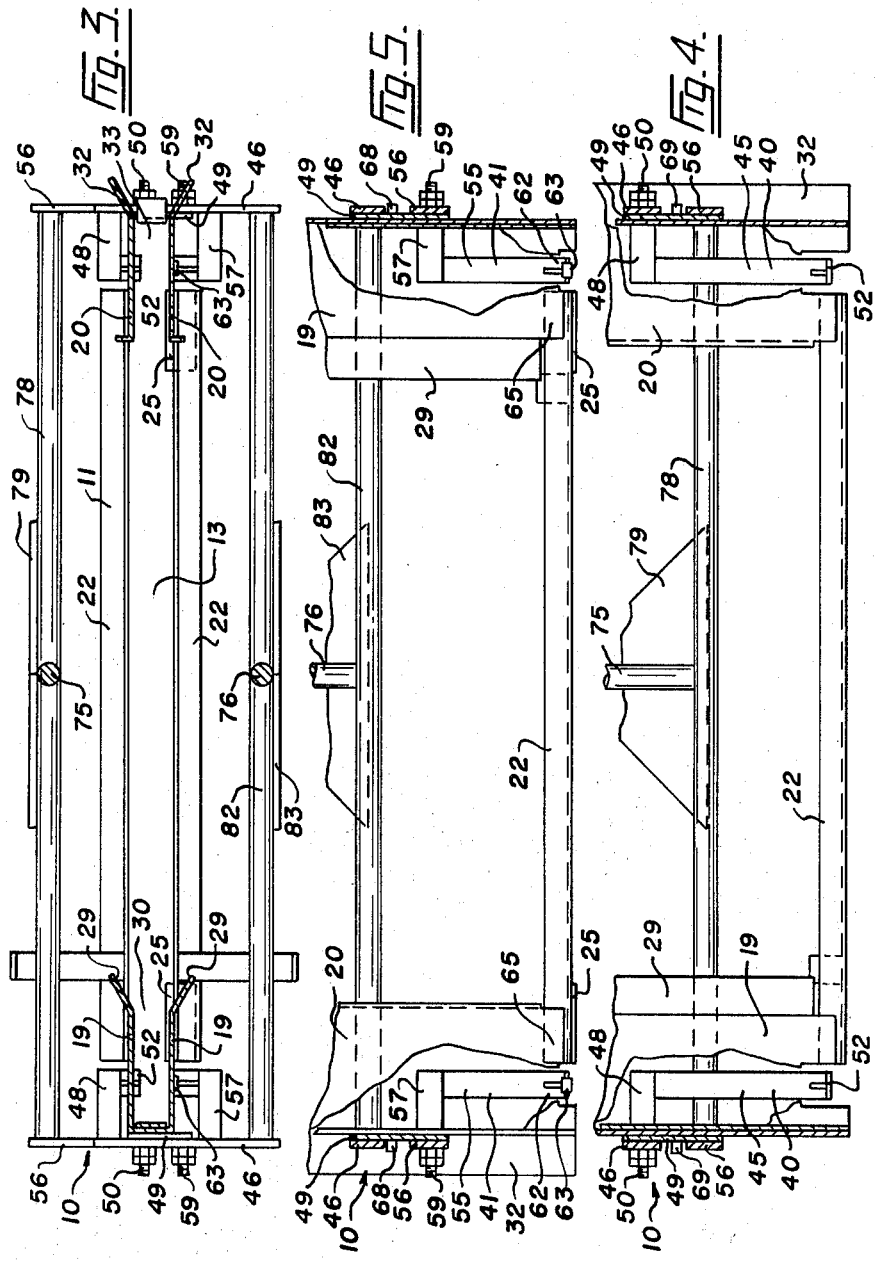

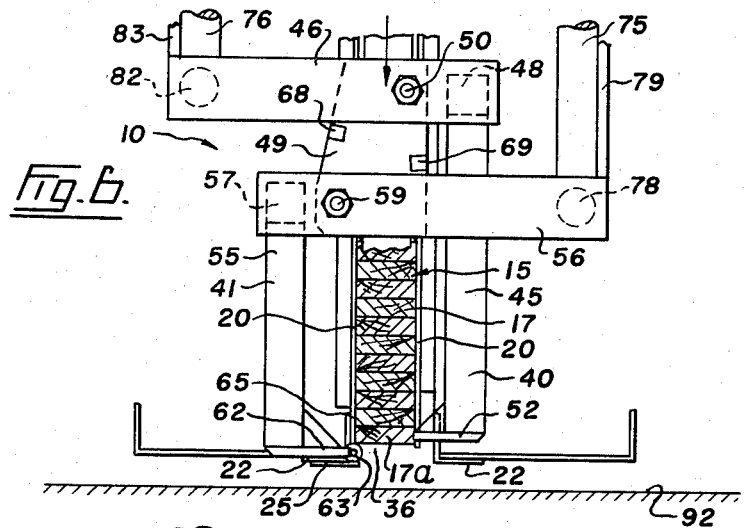
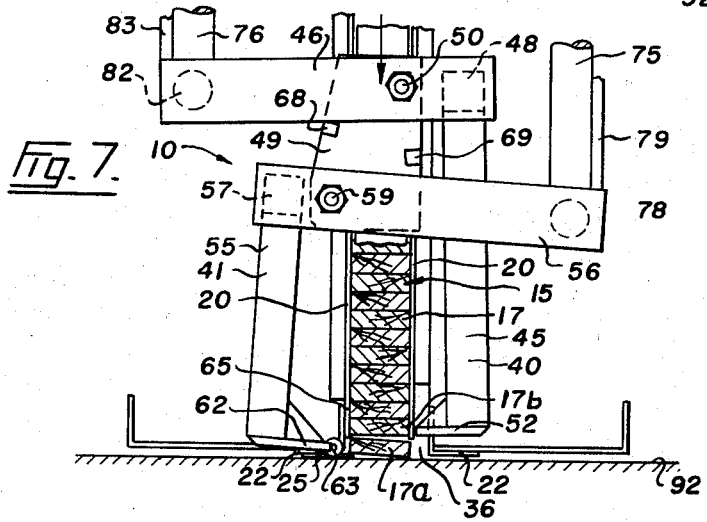
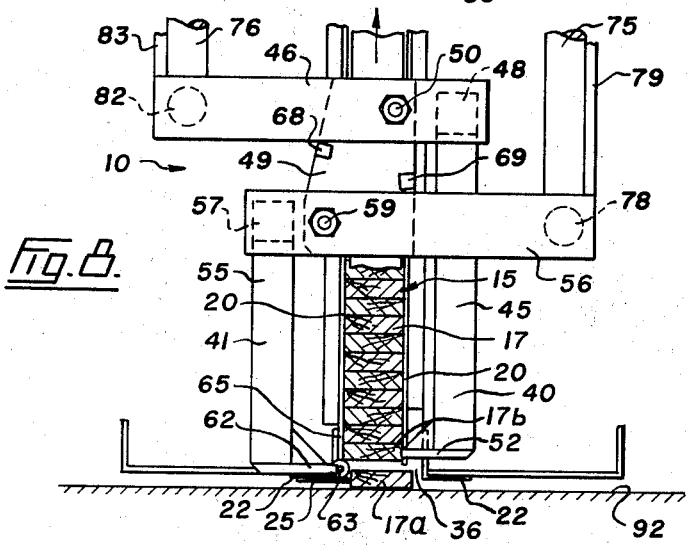

STICK DEPOSITOR WITH SURFACE ACTUATED ESCAPEMENT MECHANISM

This invention relates to apparatus for placing relatively long sticks one at a time on to a surface. Although the apparatus may be used anywhere where it is desired to place sticks formed of any material individually on to a surface, the apparatus is primarily designed for placing sticks to act as spacers between layers of lumber in a lumber pile.

In stacking lumber, it is often necessary to place cross sticks between layers of the lumber for ventilating purposes. For example, in dying kilns, stacks or piles of lumber are made by placing cross sticks between layers of the lumber, usually one board thick, as the piles are built up. This is to permit hot air to flow through the piles in order to remove moisture from all surfaces of the lumber.

Although lumber and panels are stacked by machinery, this operation is slowed down by the manual placing of the cross sticks between the layers. Although apparatus has been designed for placing the sticks, this operation is done mainly by hand. The reason for this is that the prior apparatus is relatively complicated, very heavy and difficult to maintain. An example of the prior apparatus is illustrated in U.S. Pat. No. 2,969,892, dated Jan. 31, 1961. An examination of the patent will reveal that the mechanism is quite complicated, and requires a driving motor. Other apparatus of the prior art includes hydraulic cylinders for operating gripping elements.

The stick placing apparatus of the present invention is quite simple in construction and operation, does not require any power unit for gripping and releasing sticks, drops sticks accurately and exactly where desired, can drop only one stick at a time, and drops the sticks so that they always are flat and rest on a desired face thereof.

The present stick placer utilizes the weight of the apparatus and of the stack of sticks carried thereby to provide the power for causing jaws to grip the lowermost stick in the stack carried by the apparatus. In addition to this, each stick can be placed accurately. The apparatus is lowered to place the stick where desired, and this lowering and placing operation simultaneously causes the stick to be released. Therefore, the stick is placed in the desired position and not just dropped therein.

Apparatus for placing sticks one at a time on to a surface in accordance with this invention comprises a container for holding a stack of long sticks and having an opening at the lower end thereof through which sticks can drop, a pair of opposed jaws swingably mounted on the container and positioned to support the lowermost stick of the stack at said opening and consequently the stack above the opening, vertically movable means for supporting the container, said supporting means being connected to the jaws and by the latter to the container so that the weight of the container and any sticks therein tends to move the jaws towards each other to support said lowermost stick, and stop means at the bottom of the container for engaging said surface during downward movement of the apparatus to stop the downward movement of the container and thereby causing the jaws to move away from each other to permit said lowermost stick to drop through the opening on to said surface, upward movement of the apparatus causing the jaws to move towards each other to support the next stick in the stack.

More specifically, apparatus according to this invention comprises a container for holding a stack of long sticks and having an opening at the lower end thereof through which sticks can drop, a pair of opposed jaws swingably mounted on the container and normally in an inner position to support the lowermost stick of the stack, means connected to and supporting the container through said jaws and adapted selectively to move the container up and down so that the weight of the container and any sticks therein maintain the jaws in their normal positions, and stop means connected to the container for stopping downward movement of the container on contacting the surface wile the jaws swing to an outer position to permit the lowermost stick to drop through the opening, upward movement of the container causing the jaws to swing back to their inner positions to support the next stick in the stack.

A preferred form of this invention is illustrated in the accompanying drawings, in which FIG. 1 is a side elevation of a stick placer in accordance with this invention, FIG. 2 is an end view of this apparatus, FIG. 3 is an enlarged horizontal section taken on the line 3—3 of FIG. 1, FIG. 4 is an enlarged vertical and fragmentary section taken on the line 4—4 of FIG. 2, FIG. 5 is a view similar to FIG. 4 but taken on the line 5—5 of FIG. 2, and FIGS. 6 to 8 are enlarged diagrammatic views of the lower part of the apparatus illustrating the placing and release of a stick.

Referring to the drawings, 10 is stick placing apparatus in accordance with the present invention, and including a container 11 which forms a tall narrow pocket 13 of a cross-sectional size and shape to hold a stack 15 of sticks 17, some of these sticks being shown in FIGS. 6 to 8, but the sticks have been omitted from the remaining Figures for the sake of clarity. The container is made up of a pair of opposed plates 19 at one end thereof and another pair of opposed plates 20 at its opposite end, see FIG. 3. These pairs of opposed plates extend upwardly from a pair of lower side members 22 to a pair of upper side members 23. Side members 22 constitute the bottom of the container and act as stop means when the container is lowered on to a surface. A plurality of horizontal support plates 25 are secured to the lower edges of side member 22 and project inwardly a little beneath pocket 13, see FIG. 3. The inner edges 29 of side plates 20 are flared outwardly to form a funnel 30 at said edges. Similarly, the outer edges 32 of side plates 20 are flared outwardly to form a funnel 33. Funnels 30 and 33 face in the same direction, and that is in FIG. 3 to the right. This makes it easy to insert sticks 17 into pocket 13 by moving them lengthwise into the pocket through the right end of the apparatus. Side plates 19 and 20 form the confining walls of pocket 13. The pocket can be formed by means of solid walls extending from end to end and from top to bottom thereof, but this would be a waste of material, and would unnecessarily add to the weight of the apparatus.

The lower or bottom side members 22 are spaced apart to form an opening 36 at the bottom of the pocket through which sticks can be discharged from the latter. A pair of opposed jaws 40 and 41 are swingably mounted on container 11 and positioned to support the lowermost stick 17 of stack 15 at opening 36 and consequently supporting the stack above said opening. As the jaws 40 and 41 and the operating mechanism therefore are the same at opposite ends of container 11, only one pair will now be described, those at the right hand end of the apparatus as viewed in FIGS. 1, 3 and 4. This is the pair of jaws illustrated in FIGS. 2 and 6 to 8.

Jaw 40 is made up of rigidly connected vertical section 45 and horizontal section 46. As it is desirable to support the sticks of the stack inwardly from the ends thereof, the vertical section is spaced inwardly from the horizontal section of the jaw, and these sections are rigidly connected together by a spacer tube 48, see FIG. 4. A brace plate 49 extends between and is secured to the outer edges of side plates 20 spaced upwardly from the bottom of the container. The flared portions of plates 20 terminate above brace plate 49, as clearly shown in FIG. 2. A similar brace plate 49 extends between and is secured to the outer edges of side plates 19. Section 46 of the jaw is pivotally connected to brace plate 49 through a bushing mounted on a bolt 50 secured to and projecting outwardly from plate 49 at a first side of pocket 13 and said section 46 extends across the end of the pocket and beyond the other or second side of the container, as shown in FIGS. 6 to 8. A gripping bar or bearing 52 is secured to the lower end of vertical section 45 and extends inwardly therefrom and terminates at the adjacent side of pocket 13.

Jaw 41 is made up of a vertical section 55 and a horizontal section 56, said sections being spaced apart and rigidly secured together by a spacing tube 57. Horizontal section 56 is pivotally mounted by a bushing on a bolt 59 secured to and projecting outwardly from brace plate 49 and spaced laterally from and below the level of bolt 50. Bolt 59 is located near said second side of pocket 13, and jaw section 56 extends back across the end of the pocket and outwardly beyond said first side of the pocket. A bearing 62 is fixedly connected to the lower end of vertical section 55 and projects inwardly therefrom beneath pocket 13 and below the level of gripping bar or bearing 52, see FIG. 6. Bearing 62 preferably has a roller 63 mounted on its inner end.

A bearing plate or surface 65 opposed to bearing 52 and on the opposite side of pocket 13 is formed by the portion of side plate 20 opposite said bearing 52.

Jaws 40 and 41 normally swing towards each other to support the lowermost stick 17a in stack 15, as shown in FIG. 6. Bearing 52 of jaw 40 presses this stick against bearing plate 65, while the roller of bearing 62 of jaw 41 lies beneath the stick adjacent the edge thereof which is retained against plate 65. Although not absolutely necessary, it is desirable to limit the outward movement of the jaws away from each other, and in this example, a bracket 68 projects outwardly from brace plate 49 between sections 46 and 56 of the jaw, and another bracket 69 projects outwardly from this brace plate above section 56 of jaw 41 to limit the inward movement of said jaw. When the outer or free ends of jaw sections 46 and 56 swing downwardly, jaws 40 and 41 are moved away from each other until these jaw sections contact bracket 68.

If the free ends of jaw sections 46 and 56 are supported while container 11 moves downwardly relative thereto, the jaws tend to move towards each other and thereby grip and support lowermost stick 17a in opening 36 of pocket 13, as illustrated in FIG. 6.

In this example, container 11 is normally supported by suitable means connected to the free ends of jaw sections 46 and 56 so that said container is actually carried through its connection to the jaws, and the weight of the container and its contents exert a continuous downward force on jaw sections 46 and 56 where they are connected to the container so that the jaws are normally biased towards each other when apparatus 10 is suspended.

Vertically movable supporting means 73 is provided for container 11. In this example, the supporting means consists of longitudinally adjustable vertical rods 75 and 76 positioned on opposite sides of container 11 substantially midway between the ends thereof, as shown in FIGS. 1 and 2. The lower end of rod 75 is connected to a horizontal bar 78 in any suitable manner, such as by means of a gusset plate 79. Bar 78 extends between and is connected to the free ends of the horizontal sections 56 of jaws 41 at opposite ends of container. Similarly, the lower end of rod 76 is connected to a horizontal bar 82 by a gusset plate 83. Bar 82 extends between and is secured to the outer or free ends of horizontal sections 46 of jaws 40 at opposite ends of container 11. The upper ends of rods 75 and 76 are connected by linkage 85 and 86 to a beam 89. The opposite ends of this beam, not shown, are supported by suitable means for moving the beam up and down. As this vertically-movable supporting means does not form part of the present invention, it will not be described and illustrated herein.

In actual practice, there usually are a number of stick placers 10 suspended from a beam 89. Each stick placer is loaded with sticks 17, and after a layer of lumber or panels has been layed out beneath and extending longitudinally of beam 89, the beam is lowered to place a plurality of spaced cross sticks on the layer. After the beam has been raised, another layer is layed on the cross sticks, and the process is repeated until a desired pile of lumber or panels has been built up.

When stick placer 10 is suspended from beam 89, the lowermost stick 17a is pressed by bearing 52 of jaw 40 against bearing plate 65, and said stick may also rest on the roller of bearing 62 of jaw 41. At this time, container 11 is carried by supporting rods 75 and 76 so that the weight of the container and the stick stack 15 therein is applied to jaws 40 and 41 through the pivots formed by bolts 49 and 59. Thus, the energy for retaining the lowermost stick and supporting the stack is supplied by the weight of the container and the stack.

When it is desired to place stick 17a, beam 89 is lowered until stops 22 engage the upper surface 92 of the layer of lumber or panels beneath the apparatus. The container stops moving, but further downward movement of beam 89, linkage 85 and 86 making this possible, allows the weight of supporting means 73 to bear down on the outer ends of jaw sections 46 and 56 to swing jaws 40 and 41 away from each other. As jaw 40 moves outwardly, the lateral pressure on stick 17a is released, and the edge of the stick engaged by bearing 52 of this jaw drops downwardly on to surface 92, as shown in FIG. 7, roller 63 supporting the opposite edge of this stick for an instant at that time, and this also keeps the next stick 17b and the stack up. Thus, the free edge of stick 17a is resting on surface 92 at about the time the opposite edge thereof is released. Movement of jaw 41 outwardly withdraws bearing roller 63 from beneath the stick so that it drops down onto surface 92 and plates 25. This will occur even if the edge of stick 17a did not drop down when first released by jaw 40 because of the weight of the sticks above 17a. The stack moves downwardly at the same time, and stick 17b rests on stick 17a and supports the stack. As jaw 41 is moved outwardly, the roller 63 of bearing 62 turns so that this roller actually travels along the bottom of the stick and up the side edge thereof with a minimum of friction so that there is no danger of the stick being misplaced or drawn out of position at this time. The plates 25 ensure that the stick 17a is properly aligned with the bottom of container 11 at this time.

Beam 89 is now raised, and the first part of this action is transmitted through supporting means 73 to the jaws to swing them towards each other. At this time, jaw 41 presses stick 17b against the opposed bearing plate 65, and bearing roller 63 moves beneath stick 17b to help support it. This action shifts stick 17a a little to the left, as viewed in FIGS. 6 to 8, and off plates 25. The amount of this movement is very small, and is taken into account when apparatus 10 is first positioned relative to beam 89 so that the stick ends in its proper position on surface 92.

This action can be repeated until all of the sticks of stack 15 are placed. Pocket 13 of the apparatus is reloaded by inserting sticks thereinto by moving them between side plates 20 and successively through funnels 33 and 30.

From the above it will be seen that the weight of apparatus 10 and its load are utilized to grip the lowermost stick and to support the stack of sticks in pocket 13. In order to place and release a stick, it is only necessary to lower the apparatus until stops 22 engage the surface on which the sticks are to be laid. This automatically releases the lowermost stick, utilizing the weight of part of the apparatus for this purpose. When the apparatus is raised, the stick that is now at the bottom of the stack is gripped and the stick stack supported thereby.

We claim:

1. Apparatus for placing long sticks one at a time on to a surface, comprising a container for holding a stack of long sticks and having an opening at the lower end thereof through which sticks can drop, a pair of opposed jaws swingably mounted on the container and positioned to support the lowermost stick of the stack at said opening and consequently the stack above the opening, vertically movable means for supporting the container, said supporting means being connected to the jaws and by the latter to the container so that the weight of the container and any sticks therein tends to move the jaws towards each other to support said lowermost stick, and stop means at the container for engaging said surface during downward movement of the apparatus to stop the downward movement of the container and thereby causing the jaws to move away from each other to permit said lowermost stick to drop through the opening on to said surface, upward movement of the apparatus causing the jaws to move towards each other to support the next stick in the stack.

2. A stick placer as claimed in claim 1 in which each jaw has rigidly connected vertical and horizontal sections, each jaw being swingably mounted on the container near a side thereof with the horizontal section of said each jaw extending across to an outer end near the opposite side of the container, and said supporting means being connected to said outer end of each jaw.

3. A stick placer as claimed in claim 2 including a bearing on the vertical section of one of said jaws and projecting inwardly therefrom to press against said lowermost stick, and a bearing on the other one of said jaws and projecting inwardly therefrom immediately below the lowermost stick.

4. A stick placer as claimed in claim 3 including support means on the container on to which the side of the lowermost stick above the bearing on said other one of said jaws drops when the latter bearing is withdrawn from beneath said stick, said latter bearing moving the lowermost stick off said support means when the jaws are moved towards each other.

5. A stick placer as claimed in claim 3 in which the bearing on said other jaw comprises a roller.

6. A stick placer as claimed in claim 3 including a bearing surface opposite and spaced from the bearing on said one jaw and against which the lowermost stick is pressed by the last-mentioned bearing.

7. Apparatus for placing long sticks one at a time on to a surface, comprising a container for holding a stack of long sticks and having an opening at the lower end thereof through which sticks can drop, a pair of opposed jaws swingably mounted on the container and normally in an inner position to support the lowermost stick of the stack, means connected to and supporting the container through said jaws and adapted selectively to move the container up and down so that the weight of the container and any sticks therein maintain the jaws in their normal positions, and stop means at the container for stopping downward movement of the container on contacting the surface while the jaws swing to an outer position to permit the lowermost stick to drop through the opening, upward movement of the container causing the jaws to swing back to their inner positions to support the next stick in the stack.

8. A stick placer as claimed in claim 7 in which each jaw has rigidly connected vertical and horizontal sections, each jaw being swingably mounted on the container near a side thereof with the horizontal section of said each jaw extending across to an outer end near the opposite side of the container, and said supporting means being connected to said outer end of each jaw.

9. A stick placer as claimed in claim 8 including a bearing on the vertical section of one of said jaws and projecting inwardly therefrom to press against said lowermost stick, and a bearing on the other one of said jaws and projecting inwardly therefrom immediately below the lowermost stick.

10. A stick placer as claimed in claim 9 in which the bearing on said other jaw comprises a roller.

11. A stick placer as claimed in claim 9 including a bearing surface opposite and spaced from the bearing on said one jaw and against which the lowermost stick is pressed by the last-mentioned bearing.

12. Apparatus for placing long sticks one at a time on to a surface, comprising a container for holding a stack of long sticks and having an opening at the lower end thereof through which sticks can drop, gripping means near each end of the container; each of said gripping means comprising a pair of opposed jaws swingably mounted on the container one at each side thereof and positioned to support the adjacent end of the lowermost stick of the stack at said opening; first connecting means interconnecting the two jaws on one side of the container, second connecting means interconnecting the two jaws on the other side of the container, means for supporting the container and selectively moving said container up and down, said supporting means being connected to said first and second connecting means and thereby to the jaws and by the latter to the container so that when the weight of the container and any sticks therein tend to move the jaws towards each other to support said lowermost stick, and stop means at the container for engaging said surface during downward movement of the apparatus to stop the downward movement of the container and thereby causing the jaws to move away from each other to permit said lowermost stick to drop through the opening on to said surface, upward movement of the apparatus causing the jaws to move towards each other to support the next stick in the stack.

13. A stick placer as claimed in claim 12 in which each jaw has rigidly connected vertical and horizontal sections, each jaw being swingably mounted adjacent the vertical section thereof on the container with the horizontal section of said each jaw extending across to an outer end near the opposite side of the container, and said supporting means being connected to said outer end of each jaw.

14. A stick placer as claimed in claim 13 including a bearing on the vertical section of one of said jaws and projecting inwardly therefrom to press against said lowermost stick, and a bearing on the other one of said jaws and projecting inwardly therefrom immediately below the lowermost stick.

15. A stick placer as claimed in claim 14 in which the bearing on said other jaw comprises a roller.

16. A stick placer as claimed in claim 14 including a bearing surface opposite and spaced from the bearing on said one jaw and against which the lower stick is pressed by the last-mentioned bearing.

* * * * *